United States Patent
Morden et al.

(10) Patent No.: US 10,626,908 B2
(45) Date of Patent: Apr. 21, 2020

(54) ELECTROMAGNETIC EFFECT PROTECTIVE FASTENER WITH FRANGIBLE COLLAR

(71) Applicant: The Boeing Company, Chicago, IL (US)

(72) Inventors: Sean D. Morden, Federal Way, WA (US); Blake A. Simpson, Kent, WA (US); Tanni Sisco, Mukilteo, WA (US); Kwok-Tung Chan, Seattle, WA (US); Monica J. Brockway, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 15/941,425

(22) Filed: Mar. 30, 2018

(65) Prior Publication Data

US 2019/0301513 A1 Oct. 3, 2019

(51) Int. Cl.
*F16B 31/02* (2006.01)
*F16B 33/06* (2006.01)
*B64D 45/02* (2006.01)

(52) U.S. Cl.
CPC ............ *F16B 31/021* (2013.01); *B64D 45/02* (2013.01); *F16B 33/06* (2013.01)

(58) Field of Classification Search
CPC ........ F16B 31/021; F16B 33/06; B64D 45/02; Y10T 29/49963
See application file for complete search history.

(56) References Cited

U.S. PATENT DOCUMENTS

| 2,795,444 | A | | 6/1957 | Nenzell |
| 2,940,495 | A | | 6/1960 | Wing |
| 3,170,701 | A | | 2/1965 | Hoover |
| 3,482,864 | A | * | 12/1969 | Bynum ................ F16B 31/021 411/5 |
| 3,512,447 | A | | 5/1970 | Vaughn |

(Continued)

FOREIGN PATENT DOCUMENTS

EP 2871132 A1 5/2015

OTHER PUBLICATIONS

Search Report for related European Application No. EP19162429.5; report dated Jul. 30, 2019.

*Primary Examiner* — Bayan Salone
(74) *Attorney, Agent, or Firm* — Miller, Matthias & Hull LLP (57) ABSTRACT

An electromagnetic effect suppressing termination part is provided for a fastener formed of a metallic material, the fastener having a head, a shank, and a threaded portion opposite the head. The termination part includes a main body defining an internally threaded portion configured to threadably receive the threaded portion of the fastener, the internally threaded portion defining a thread major diameter. A collar is coupled to a distal end of the main body by a frangible web, wherein the main body, collar, and frangible web are formed of a metallic core coated by a layer of dielectric material. The frangible web, when broken, presents an exposed portion of the metallic core, wherein the frangible web includes an inner surface radially outwardly offset from the thread major diameter of the internally threaded portion by a setback distance.

20 Claims, 8 Drawing Sheets

(56) References Cited

U.S. PATENT DOCUMENTS

| | | | | |
|---|---|---|---|---|
| 4,326,825 A * | 4/1982 | Volkmann | ............... | F16B 4/004 |
| | | | | 411/361 |
| 4,630,168 A | 12/1986 | Hunt | | |
| 5,018,920 A | 5/1991 | Speakman | | |
| 5,865,581 A * | 2/1999 | Sadri | ................. | F16B 31/021 |
| | | | | 411/270 |
| 6,665,922 B2 | 12/2003 | Schultz | | |
| 7,599,164 B2 | 10/2009 | Heeter et al. | | |
| 7,695,226 B2 * | 4/2010 | March | ..................... | F16B 5/02 |
| | | | | 411/43 |
| 7,755,876 B2 * | 7/2010 | Morrill | ................. | B64D 45/02 |
| | | | | 361/218 |
| 8,573,910 B2 | 11/2013 | March et al. | | |
| 9,291,187 B2 | 3/2016 | Whitlock et al. | | |
| 9,611,052 B2 | 4/2017 | Whitlock et al. | | |
| 9,802,715 B2 | 10/2017 | Whitlock et al. | | |
| 2001/0018014 A1 | 8/2001 | Ito | | |
| 2009/0258220 A1 | 10/2009 | Schaaf et al. | | |
| 2010/0270513 A1 | 10/2010 | Haylock et al. | | |
| 2010/0272537 A1 | 10/2010 | Haylock et al. | | |
| 2010/0278616 A1 | 11/2010 | March et al. | | |
| 2014/0055906 A1 * | 2/2014 | Whitlock | ............... | B64D 45/02 |
| | | | | 361/218 |
| 2014/0338179 A1 * | 11/2014 | Whitlock | ................. | B23G 9/00 |
| | | | | 29/525.02 |

* cited by examiner

ELECTROMAGNETIC EFFECT PROTECTIVE FASTENER WITH FRANGIBLE COLLAR

FIELD

The present disclosure generally relates to fasteners and, more specifically, to fastener termination parts that provide protection against electromagnetic effects.

BACKGROUND

The use of lightweight composite materials in vehicles, such as aircraft, provide an improved strength-to-weight ratio that translates to fuel savings and lower operational costs. Composite materials, however, do not readily conduct away extreme electrical currents and electromagnetic forces generated by lightning strikes. Furthermore, composite or metallic structures used on vehicles are typically assembled using metallic fastener systems, which are conductive and therefore create electromagnetic effect (EME) design considerations. For example, fastener sparking modes must be designed for lightning conditions that include hot particle ejection and arcing between the fastener and surrounding structures.

SUMMARY

In accordance with one aspect of the present disclosure, an electromagnetic effect suppressing termination part is provided for a fastener formed of a metallic material, the fastener having a head, a shank, and a threaded portion opposite the head. The termination part includes a main body defining an internally threaded portion configured to threadably receive the threaded portion of the fastener, the internally threaded portion defining a thread major diameter. A collar is coupled to a distal end of the main body by a frangible web, wherein the main body, collar, and frangible web are formed of a metallic core coated by a layer of dielectric material. The frangible web, when broken, presents an exposed portion of the metallic core, wherein the frangible web includes an inner surface radially outwardly offset from the thread major diameter of the internally threaded portion by a setback distance.

In accordance with another aspect of the present disclosure, a fastener assembly is provided for protection against electromagnetic effects. The fastener assembly includes a fastener formed of a metallic material and having a head, a shank, and a threaded portion opposite the head. The fastener assembly also includes a termination part having a metallic core coated by a layer of dielectric material, the termination part including a main body defining an internally threaded portion configured to threadably receive the threaded portion of the fastener, wherein the internally threaded portion defines a thread major diameter. The termination part also includes a collar coupled to a distal end of the main body by a frangible web, wherein the frangible web when broken presents an exposed portion of the metallic core. The frangible web includes an inner surface radially outwardly offset from the thread major diameter of the internally threaded portion by a setback distance.

In accordance with a further aspect of the present disclosure, a method of fastening a structural assembly while suppressing electromagnetic effects includes inserting a fastener formed of a metallic material through a first structural member so that a shank of the fastener extends through a first through hole formed in the first structural member, the fastener including a threaded portion. The method further includes threading a termination part having a metallic core coated by a layer of dielectric material onto the fastener, the termination part having a main body defining an internally threaded portion configured to threadably receive the threaded portion of the fastener, the internally threaded portion defining a thread major diameter. A torque is applied to a collar of the termination part until a frangible web connecting the collar to a distal end of the main body of the termination part breaks, wherein the frangible web when broken presents an exposed portion of the metallic core. The frangible web includes an inner surface radially outwardly offset from the thread major diameter of the internally threaded portion by a setback distance.

In another aspect of the disclosure that may be combined with any of these aspects, the setback distance is sufficient to prevent arcing between the exposed portion of the metallic core and the threaded portion of the fastener.

In another aspect of the disclosure that may be combined with any of these aspects, the shank of the fastener has a shank diameter, and the setback distance is approximately $\frac{1}{25}$ to $\frac{1}{4}$ of the shank diameter.

In another aspect of the disclosure that may be combined with any of these aspects, the main body further defines a proximal end nearer the head of the fastener, and a counterbore hole is formed in the proximal end, wherein an annular seal is disposed in the counterbore hole.

In another aspect of the disclosure that may be combined with any of these aspects, the annular seal is formed of a polymeric material.

In another aspect of the disclosure that may be combined with any of these aspects, a washer is located adjacent the proximal end of the main body.

In another aspect of the disclosure that may be combined with any of these aspects, the frangible web is configured to break at a predetermined torque threshold The features that have been discussed can be achieved independently in various embodiments or may be combined in yet other embodiments, further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The embodiments disclosed herein provide apparatus and systems for terminating fasteners in a manner that protects against EME. A termination part for a fastener includes a frangible collar that breaks when sufficient torque is applied during assembly on the fastener. When the frangible collar breaks, a portion of a metallic core of the termination part is exposed, potentially exacerbating EME. According to certain aspects of the present disclosure, the frangible collar is configured so that the exposed portion of the core is spaced sufficiently from the fastener to reduce EME.

Figure 1:
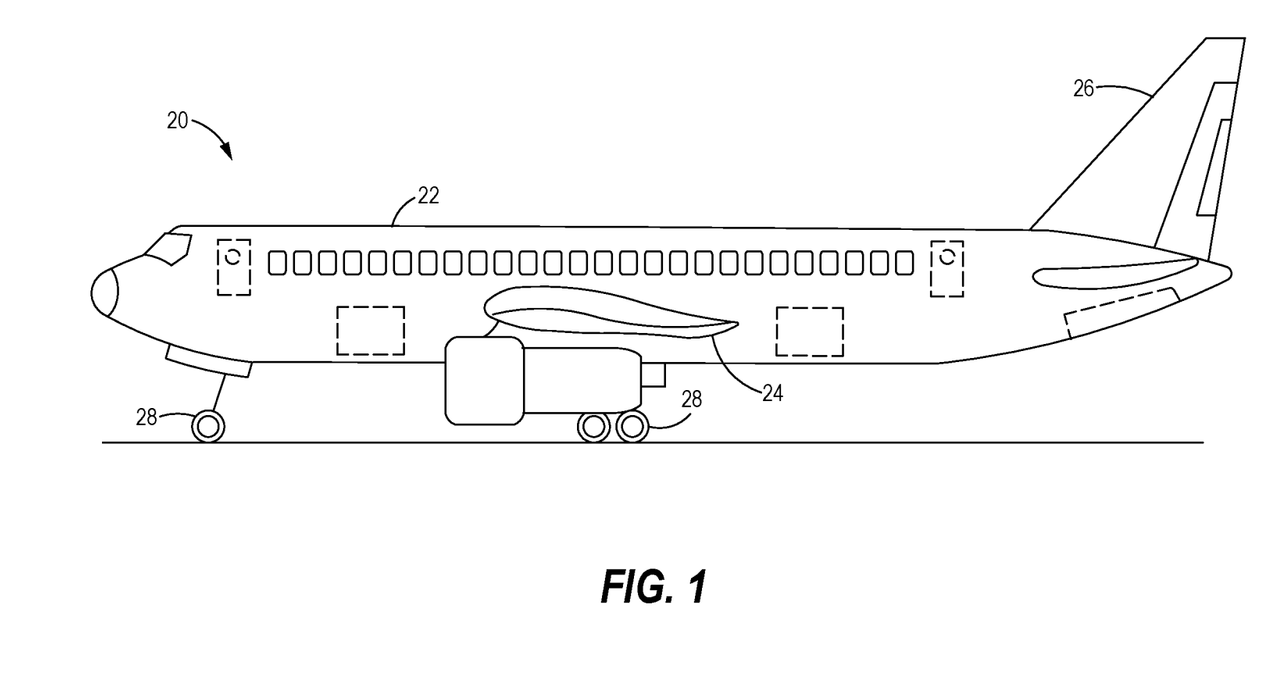
FIG. 1 is a schematic illustration of an aircraft.

Referring to FIG. 1, the embodiments disclosed herein may be described in the context of aircraft assembly. An aircraft 20 may include a fuselage 22, wing assemblies 24, empennage 26, and landing gear assemblies 28. For an aircraft of this type, a large number of fastener assemblies—in some cases on the order of one million assemblies—may be used to fasten together the various components and sub-components. EME protection is desirable in certain locations on the aircraft 20. For example, EME protection is desirable for wing assemblies 24 and other structures. To provide EME protection, the wing assemblies 24 may be assembled with as many as 20,000 fasteners.

An exemplary fastener assembly 30 that protects against EME is illustrated at FIGS. 2-5. As shown, the fastener assembly 30 is used to assemble a first structural member 32 to a second structural member 34. The first and second structural members 32, 34 may be provided with components or sub-components, such as the wing assemblies 24, provided on the aircraft 20. In the illustrated embodiment, the first structural member 32 has a first through hole 36, while the second structural member 34 has a second through hole 38. As shown, the second through hole 38 is aligned with the first through hole 36. In some embodiments, each of the first and second structural members 32, 34 is formed of a composite material, and the fastener is formed of a metallic material. In other embodiments, each of the first and second structural members 32, 34 is formed of a metallic material, while in still other embodiments one of the first and second structural members 32, 34 is formed of a metallic material while the other of the first and second structural members 32, 34 is formed of a composite material. While, in the illustrated embodiments, the fastener assembly 30 is shown assembling two structural components, it will be appreciated that the fastener assembly 30 may be used with a single structural member, more than two structural members, or provided separately on its own.

Figure 2:
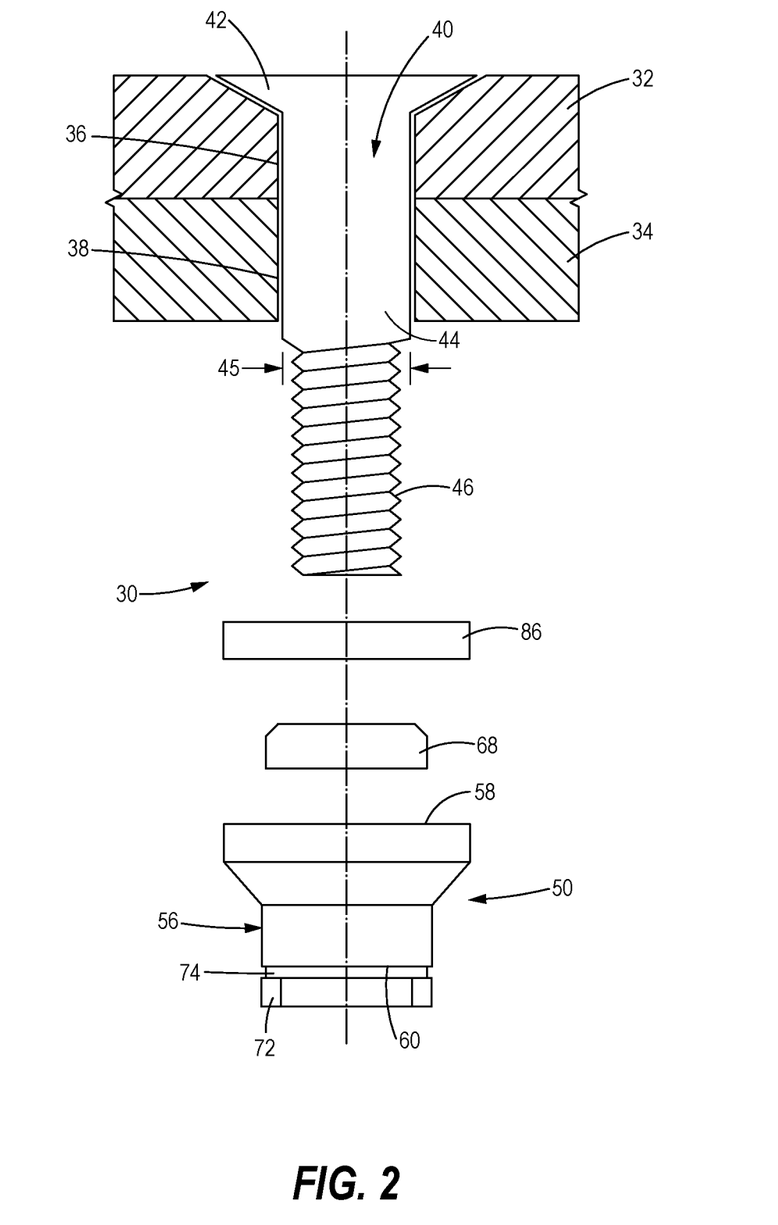
FIG. 2 is an exploded perspective view, partially in cross-section, of an EME protective fastener system with frangible collar, in accordance with the present disclosure.
Figure 3:
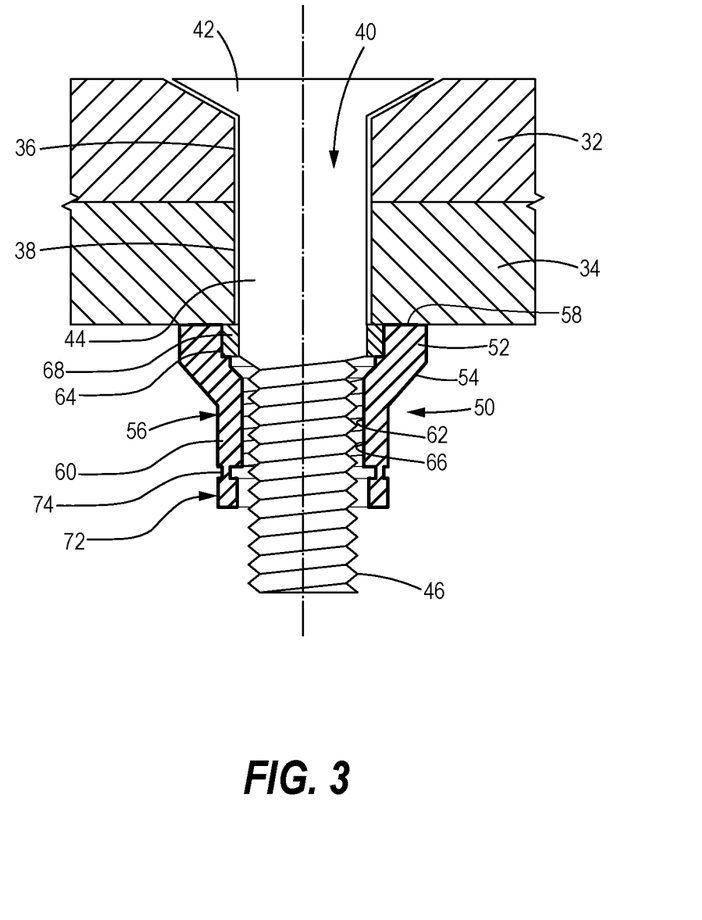
FIG. 3 is a side elevation view, in partial cross-section, of the EME protective fastener system of FIG. 2, assembled with structures provided on a vehicle and with an intact frangible collar.
Figure 4:
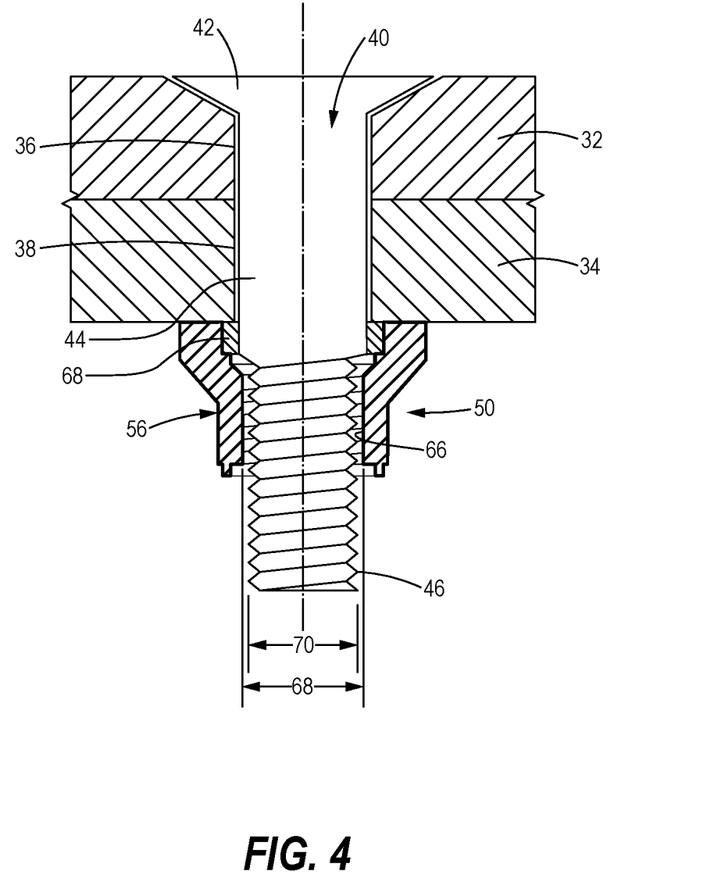
FIG. 4 is a side elevation view, in partial cross-section, of the EME protective fastener system of FIG. 2, assembled with structures provided on a vehicle and with the frangible collar broken off.

A fastener 40 formed of metallic material is provided to fasten together the first and second structural members 32, 34. As best shown in FIGS. 2-4, the fastener 40 includes a head 42, a shank 44, and a male threaded portion 46 provided opposite the head 42. The shank 44 is sized for slidable insertion through the first and second through holes 36, 38 of the first and second structural members 32, 34, respectively.

Figure 7:
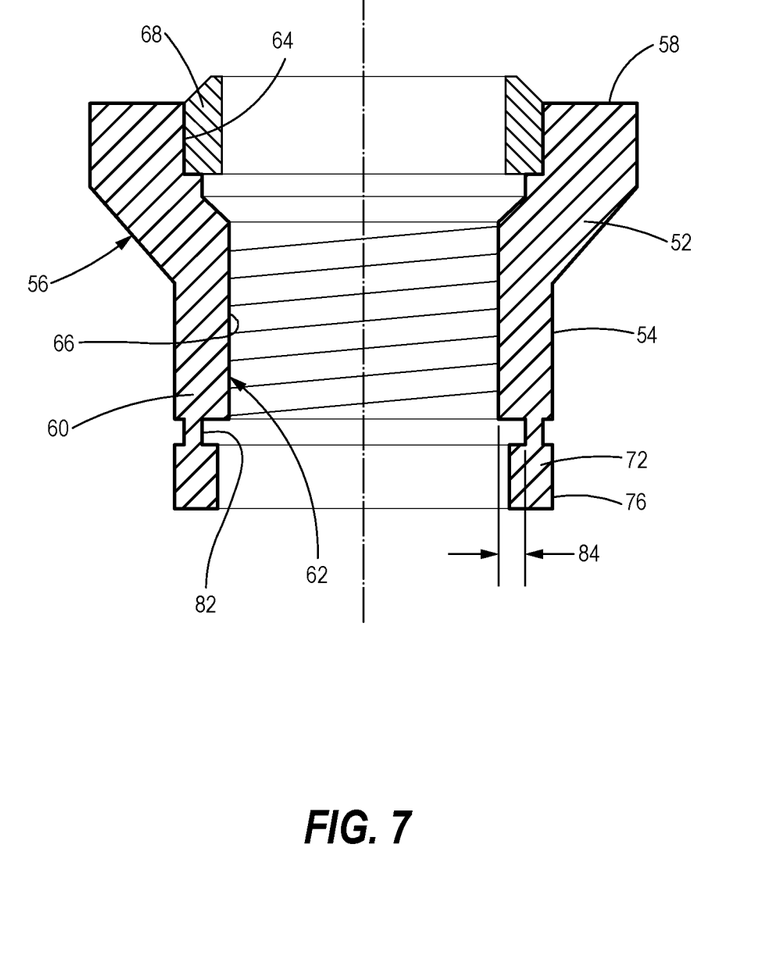
FIG. 7 is a side elevation view, in cross-section, of the termination part shown in FIG. 6.

A termination part 50 is provided for terminating the fastener 40, so that the fastener assembly 30 securely fastens the first and second structural members 32, 34, as best shown in FIGS. 2-4. The termination part 50 has a core 52 formed of metallic material to provide sufficient strength. As particularly shown in FIGS. 5 and 7, the metallic core 52 is coated by a layer 54 of dielectric material (illustrated in the figures with a relatively thicker line tracing a periphery of the termination part 50) to block the electrical bonding path between the fastener 40 and the termination part 50. The dielectric material may be any material that exhibits dielectric properties, such as thermosets, thermoplastics, rubber, ceramics, and elastomers.

With reference to FIGS. 2-4 and 6-7, the termination part 50 includes a main body 56. The main body 56 defines a proximal end 58 facing the second structural member 34 and a distal end 60 opposite the proximal end 58. An internal bore 62 formed through the main body 56 includes a counterbore hole 64 at the proximal end 58, and an internally threaded portion 66 formed at the distal end 60. An annular seal 68 is sized for insertion into the counterbore hole 64, and is formed of a dielectric material such as a polymeric material. The internally threaded portion 66 is configured to threadably receive the threaded portion 46 of the fastener 40. The internally threaded portion 66 may include a female thread major diameter 68 that closely receives a male thread major diameter 70 of the fastener.

The termination part 50 further includes a collar 72 coupled to the distal end 60 of the main body 56 by a frangible web 74 to provide torque control during assembly of the termination part 50 on the fastener 40. As best shown with reference to FIGS. 6 and 7, the collar 72 has an outer surface 76 configured to receive a torque applying tool. For example, the outer surface 76 may have a hexagonal shape to receive a wrench 78. In the illustrated embodiment, the frangible web 74 is formed by a portion of reduced thickness relative to the main body 56 and the collar 72, to form a localized area of weakness in the termination part 50. Accordingly, when a torque is applied to the collar 72 to thread the termination part 50 onto the fastener, the frangible web 74 will break at predetermined torque threshold, thereby limiting the amount of torque applied during installation of the termination part 50 to a value that avoids damaging the termination part 50 or the annular seal 68.

Figure 5:
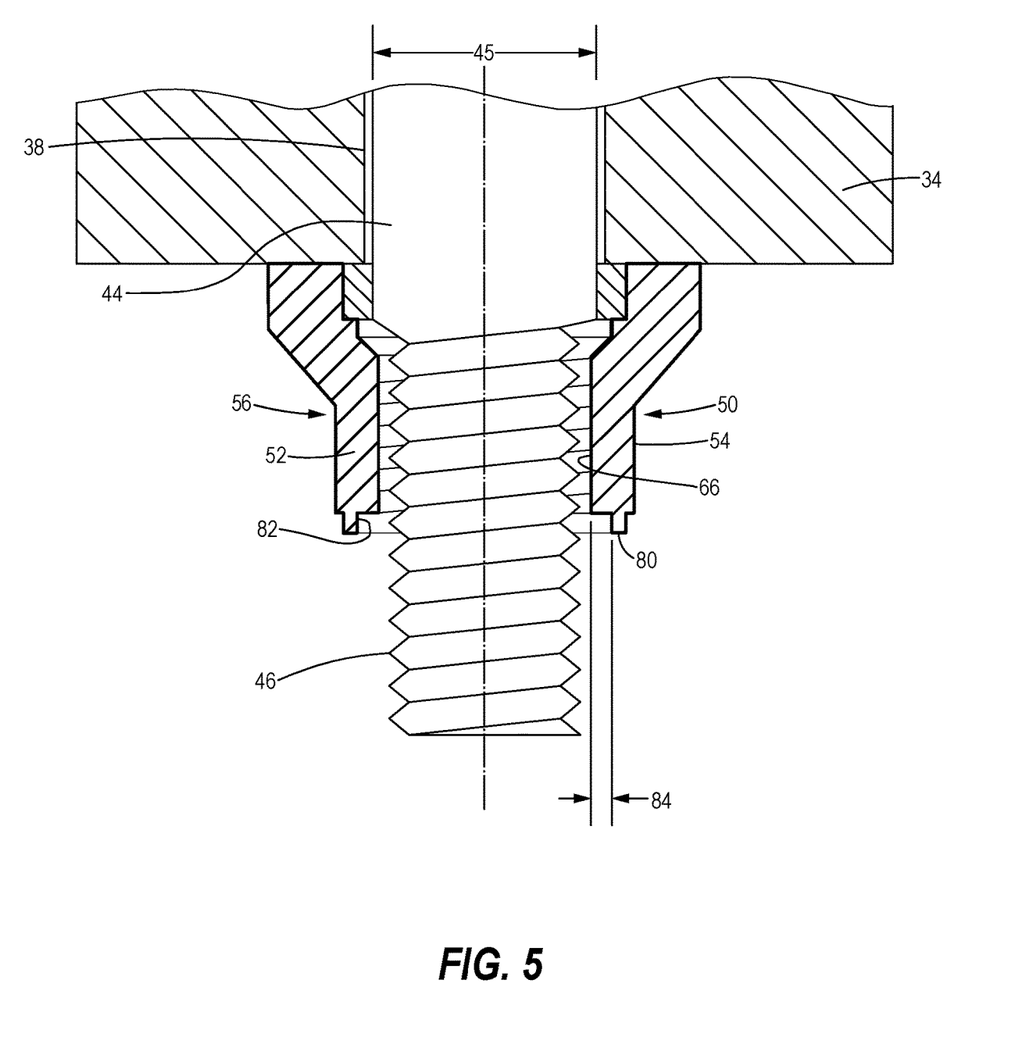
FIG. 5 is an enlarged detail of a distal end of the EME protective fastener system taken from FIG. 4.
Figure 6:
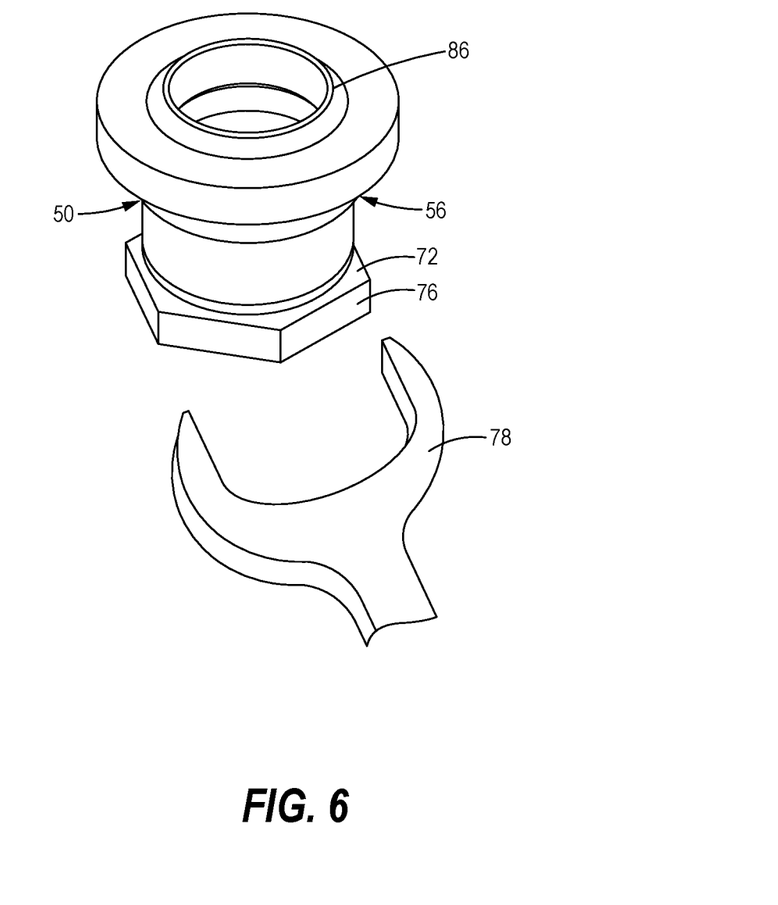
FIG. 6 is a perspective view of a termination part for use in the EME protective fastener system of FIG. 2.

The frangible web 74 is further configured to protect against EME. More specifically, when the frangible web 74 is broken and the collar 72 removed, an exposed portion 80 of the metallic core 52 of the termination part 50 is present. Exposed metallic material in proximity to the metallic fastener 40 may increase the likelihood of EME. Accordingly, the frangible web 74 has an inner surface 82 that is radially outwardly offset by a setback distance 84 from the female thread major diameter 68, as best shown in FIG. 5. The setback distance 84 is sufficient to prevent arcing between the exposed portion 80 of the metallic core 52 and the male threaded portion 46 of the fastener 40. In some embodiments, the setback distance 84 is defined relative to a shank diameter 45 of the shank 44 of the fastener 40, as shown in FIG. 2. For example, the setback distance 84 is between approximately 1/25 to 1/4 of the shank diameter 45. Thus, in certain applications a minimum setback distance may be as small as approximately 0.5 millimeters, but may also be larger than 0.5 millimeters depending on the size of the shank diameter 45.

Optionally, the fastener assembly 30 may further include a washer 86. The washer 86 may be disposed between the proximal end 58 of the main body 56 and the second structural member 34. The optional washer 86 is shown in FIG. 2, but has been omitted from the other drawings for clarity.

While a fastener assembly 30 is described above as having the fastener 40 and the termination part 50 to secure together first and second structural members 32 34, it will be appreciated that the termination part 50 may be used with a single structural member, more than two structural members, or provided individually for use with an existing fastener and/or structural members. As presented in the appended claims, the termination part 50 includes the main body 56, collar 72, and frangible web 74, with the inner surface 82 of the frangible web 74 radially outwardly offset from the female thread major diameter 68 by the setback distance.

Figure 8:
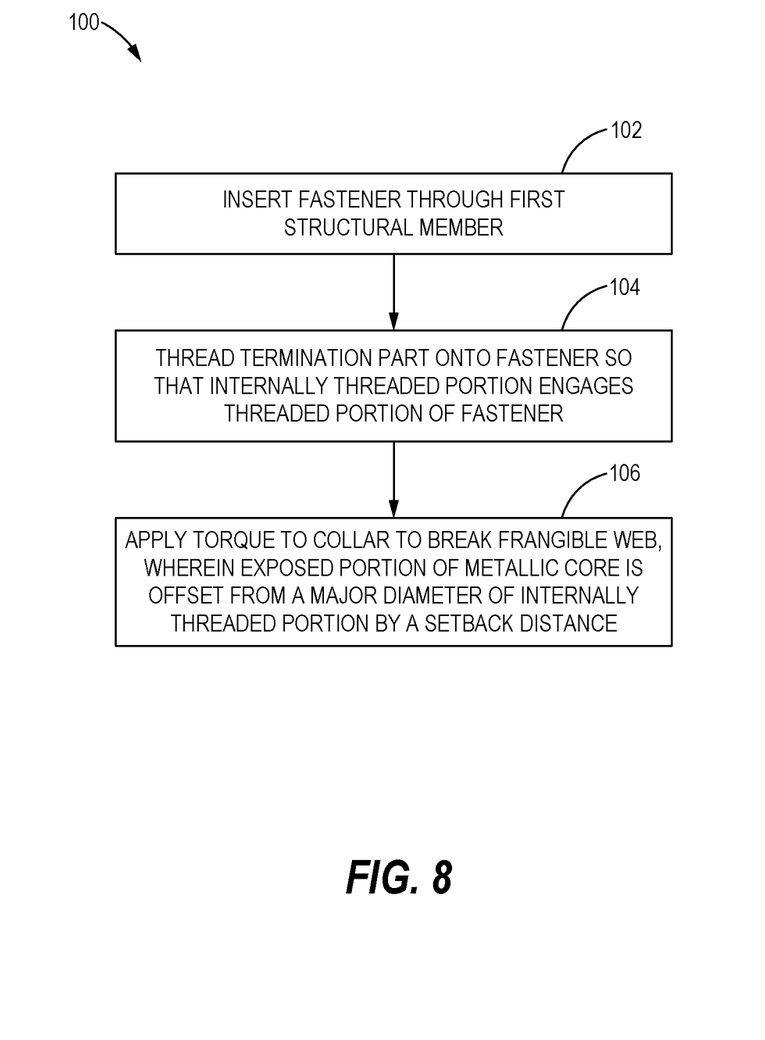
FIG. 8 is a block diagram illustrating a method of fastening a structural assembly while suppressing electromagnetic effects, in accordance with the present disclosure.

FIG. 8 shows a block diagram of a method 100 of fastening a structural assembly while suppressing electromagnetic effects. The steps of the method may be performed in other sequences than the particular sequence shown, and the particular sequence shown by the block diagram is representative.

At block 102 of the method 100, a fastener 40, formed of a metallic material, is inserted through a first structural member so that a shank of the fastener extends through a first through hole of the first structural member. The fastener includes a male threaded portion.

At block 104, a termination part, having a metallic core coated by a layer of dielectric material, is threaded onto the fastener. The termination part has a main body defining an internally threaded portion configured to threadably receive the threaded portion of the fastener. The internally threaded portion defines a female thread major diameter.

At block 106, torque is applied to a collar of the termination part until a frangible web connecting the collar to a distal end of the main body of the termination part breaks. When the frangible web breaks, an exposed portion of the metallic core is presented. The frangible web includes an inner surface outwardly offset from the female thread major diameter of the internally threaded portion by a setback distance. The setback distance is sufficient to prevent arcing between the exposed portion of the metallic core and the threaded portion of the fastener.

Although described in terms of specific structures and components, other configurations and/or other components may be utilized, potentially in other environments. Moreover, although the disclosure presents structures in only shapes and sizes depicted, numerous variations of disclosed structures may be envisioned for use in alternative embodiments, as may be appreciated by those skilled in the art.

What is claimed is:

1. An electromagnetic effect suppressing termination part for a fastener formed of a metallic material, the fastener having a head, a shank, and a threaded portion opposite the head, the termination part comprising:
a main body defining an internally threaded portion configured to threadably receive the threaded portion of the fastener, the internally threaded portion defining a thread major diameter; and
a collar coupled to a distal end of the main body by a frangible web;
wherein the main body, collar, and frangible web are formed of a metallic core coated by a layer of dielectric material;
wherein the frangible web when broken presents an exposed portion of the metallic core, the frangible web including an inner surface radially outwardly offset from the thread major diameter of the internally threaded portion by a setback distance, the setback distance being approximately 0.5 mm or greater.

2. The electromagnetic effect suppressing termination part of claim 1, in which the setback distance is sufficient to prevent arcing between the exposed portion of the metallic core and the threaded portion of the fastener.

3. The electromagnetic effect suppressing termination part of claim 1, in which the shank of the fastener has a shank diameter, and in which the setback distance is approximately $\frac{1}{25}$ to $\frac{1}{4}$ of the shank diameter.

4. The electromagnetic effect suppressing termination part of claim 1, in which the main body further defines a proximal end nearer the head of the fastener, and a counterbore hole is formed in the proximal end, wherein an annular seal is disposed in the counterbore hole.

5. The electromagnetic effect suppressing termination part of claim 4, in which the annular seal is formed of a polymeric material.

6. The electromagnetic effect suppressing termination part of claim 4, further comprising a washer located adjacent the proximal end of the main body.

7. The electromagnetic effect suppressing termination part of claim 1, in which the frangible web is configured to break at a predetermined torque threshold.

8. A fastener assembly for protection against electromagnetic effects, the fastener assembly comprising:
a fastener formed of a metallic material and having a head, a shank, and a threaded portion opposite the head;
a termination part having a metallic core coated by a layer of dielectric material, the termination part including:
a main body defining an internally threaded portion configured to threadably receive the threaded portion of the fastener, the internally threaded portion defining a thread major diameter;
a collar coupled to a distal end of the main body by a frangible web, wherein the frangible web when broken presents an exposed portion of the metallic core, the frangible web including an inner surface radially outwardly offset from the thread major diameter of the internally threaded portion by a setback distance, the setback distance being approximately 0.5 mm or greater.

9. The fastener assembly of claim 8, in which the setback distance is sufficient to prevent arcing between the exposed portion of the metallic core and the threaded portion of the fastener.

10. The fastener assembly of claim 8, in which the shank of the fastener has a shank diameter, and in which the setback distance is approximately $\frac{1}{25}$ to $\frac{1}{4}$ of the shank diameter.

11. The fastener assembly of claim 8, in which the main body further defines a proximal end nearer the head of the fastener and a counterbore hole is formed in the proximal end, the fastener assembly further comprising an annular seal disposed in the counterbore hole.

12. The fastener assembly of claim 11, in which the annular seal is formed of a polymeric material.

13. The fastener assembly of claim 11, further comprising a washer located adjacent the proximal end of the main body.

14. The fastener assembly of claim 8, in which the frangible web is configured to break at a predetermined torque threshold.

15. The fastener assembly of claim 8, further comprising:
a first structural member having a first through hole; and
a second structural member having a second through hole aligned with the first through hole;
wherein the shank of the fastener extends through the first and second through holes.

16. The fastener assembly of claim 15, in which each of the first and second structural members is formed of a composite material.

17. The fastener assembly of claim 15, in which each of the first and second structural members is formed of a metallic material.

18. A method of fastening a structural assembly while suppressing electromagnetic effects, the method comprising:
inserting a fastener formed of a metallic material through a first structural member so that a shank of the fastener extends through a first through hole formed in the first structural member, the fastener including a threaded portion;
threading a termination part having a metallic core coated by a layer of dielectric material onto the fastener, the termination part having a main body defining an internally threaded portion configured to threadably receive the threaded portion of the fastener, the internally threaded portion defining a thread major diameter;
applying torque to a collar of the termination part until a frangible web connecting the collar to a distal end of the main body of the termination part breaks, wherein the frangible web when broken presents an exposed portion of the metallic core, the frangible web including an inner surface radially outwardly offset from the thread major diameter of the internally threaded portion by a setback distance, the setback distance being approximately 0.5 mm or greater.

19. The method of claim 18, in which the setback distance is sufficient to prevent arcing between the exposed portion of the metallic core and the threaded portion of the fastener.

20. The method of claim 18, in which the shank of the fastener has a shank diameter, and in which the setback distance is approximately ¹/₂₅ to ¼ of the shank diameter.

* * * * *